Patented Feb. 14, 1939

2,146,744

UNITED STATES PATENT OFFICE 2,146,744

PROCESS OF PREPARING SULPHONYL HALIDES AND SULPHONIC ACIDS FROM PSEUDOTHIOUREAS

Treat B. Johnson, Bethany, Conn., assignor to Röhm & Haas Company, Philadelphia, Pa., a corporation of Delaware No Drawing. Application April 6, 1936,
Serial No. 72,983

10 Claims. (Cl. 260—503)

This invention relates to an improved method for the production of sulphonyl halides and sulphonic acids, which does not involve the use of dangerous materials such as phosphorus compounds, or the use of extremely unpleasant materials, such as the mercaptans.

The invention is particularly advantageous for the production of alkyl and aralkyl sulphonyl halides and sulphonic acids, although in its broader aspects it is also applicable to the production of aryl sulphonyl halides and sulphonic acids.

Methods heretofore proposed for the production of alkyl or aralkyl sulphonic acids have involved either the reaction of a sulphite, such as sodium or ammonium sulphite, with an alkyl or aralkyl halide, or have involved the oxidation of a mercaptan or a metal salt of a mercaptan by a strong oxidizing agent. Both of these methods of production have serious objections, and involve numerous difficulties.

Alkyl and aralkyl sulphonyl chlorides have heretofore been produced by the action of phosphorus pentachloride on the corresponding sulphonic acid. The use of phosphorus pentachloride in any commercial operation is, of course, highly objectionable, and the preparation of sulphonyl chlorides by this method is also expensive, as it involves the production of the sulphonic acid first. Furthermore, it is known that some alkyl and aralkyl sulphonyl chlorides undergo partial decomposition or dissociation in the presence of phosphorus pentachloride, giving sulphur dioxide and the corresponding alkyl and aralkyl chloride. Other sulphonyl halides, such as sulphonyl bromides, have never been produced in a practical manner heretofore. When a sulphonic acid is reacted with phosphorus pentabromide the corresponding bisulphide is often the major product of the reaction, rather than the desired sulphonyl bromide.

The present invention provides a method by which the various sulphonyl halides and sulphonic acids may be made commercially available, in which no dangerous or unpleasant materials are used, and in which the operating conditions involved in carrying out the process are simple to maintain.

The invention in its broader aspect comprehends the formation of a sulphonyl halide from a pseudothiourea or pseudothiourea salt by exposing an aqueous solution of the pseudothiourea or pseudothiourea salt to the action of a halogen, as shown in the following equation:

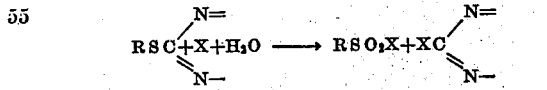

in which R represents an alkyl, aralkyl, or aromatic residue and X represents a halogen. This reaction is general, and is applicable to compounds having the pseudothiourea residue:

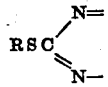

in which R represents an alkyl, an aralkyl, or an aryl residue, whether the three bonds shown on the nitrogen atoms are attached to hydrogens, to hydrocarbon radicals, other residues, or are part of a cyclic or ring structure.

From the sulphonyl halide derivatives so produced, the corresponding sulphonic acids are prepared by hydrolysis as by warming in water, and their metallic salts by reaction with alkali in aqueous solution, e. g., with sodium or potassium hydroxide.

While the invention may be used generally for the production of sulphonyl halides and sulphonic acids from compounds containing the pseudothiourea residue described above, it is particularly advantageous for the production of sulphonyl halides and sulphonic acids from salts of alkyl and aralkyl pseudothioureas, as these are the most simply prepared from commercially available materials.

As starting materials for the preparation of the alkyl and aralkyl pseudothioureas and their salts, it is preferable in some cases to use the corresponding alkyl or aralkyl alcohol, and thiourea. The thiourea is dissolved in the alcohol, using heat, as from a water bath, if necessary, and the resulting solution is treated with an excess of an acid such as hydrochloric acid and allowed to digest until the formation of the pseudothiourea hydrochloride is complete. This requires digestion for a variable time, depending on the reactivity of the respective alcohol. After digestion, the excess alcohol is distilled off and a salt of the alkyl or aralkyl pseudothiourea corresponding to the acid used is obtained. The reaction which occurs may be illustrated by the following equation, in which, for purposes of illustration, the production of the hydrochloride of ethyl pseudothiourea is shown:

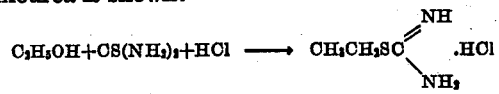

The alkyl and aralkyl pseudothiourea salts may also be produced by the action of thiourea on alkyl or aralkyl halides, sulphates, etc., such as ethyl chloride or benzychloride in the known manner.

From the salts of alkyl and aralkyl pseudothioureas so produced, the production of the corresponding sulphonyl halides in accordance with this invention is simple. It is merely necessary to pass through an aqueous solution of the pseudothiourea salt a halogen, such as chlorine or bromine, or, more broadly, to subject an aqueous solution of the pseudothiourea salt to the action of a free halogen. The halogen reacts with the salt to split the pseudothiourea residue, and to produce directly the desired sulphonyl halide, which is precipitated and is easily purified. During this operation, the reaction mixture should be maintained relatively cool, particularly when labile products, such as sulphonyl bromides are produced, to avoid decomposition. For the production of sulphonyl chlorides, the mixture is advantageously maintained below 15° C.; for sulphonyl bromides, below 5° C.

Certain precautions must be observed, however, in the preparation of the sulphonyl halide to obtain a pure product. For example, if it is desired to produce a sulphonyl chloride, then the pseudothiourea salt which is used should either be the hydrochloride or should be the salt of some other acid which does not contain a reactive halogen other than chlorine. If salts of alkyl or aralkyl pseudothioureas with acids such as hydrobromic acid are used, the chlorine used for the production of the sulphonyl chloride reacts with the bromine in the hydrobromic acid to set free bromine, with the result that instead of the sulphonyl chloride being produced, a mixture of sulphonyl chloride and sulphonyl bromide is produced. In circumstances such a mixture may be desired, and may be readily produced in this manner, but in normal circumstances a pure product, such as the sulphonyl chloride or the sulphonyl bromide, is desired, and care should be taken that any undesired halogen is not introduced into the product because of its presence in the pseudothiourea salts.

Similarly, for the production of a sulphonyl bromide, the use of hydrochloric acid salts of pseudothiourea should be avoided, as if hydrochloric acid salts are used, the desired sulphonyl bromide will be contaminated with traces of sulphonyl chloride. Thus for the production of sulphonyl bromide, either the hydrobromide of the desired pseudothiourea should be used, or else such salts as the acetate or the sulphate should be used.

Salts of other acids than the halogen acids of alkyl and aralkyl pseudothioureas may be readily produced. A preferred method of producing these salts is by the reaction of a hydrohalide of the desired pseudothiourea with an alkali metal salt, such as potassium or sodium acetate. In such a procedure, the alkali metal halide is produced simultaneously with the desired salt of the pseudothiourea. For example, if an aqueous solution of a hydrohalide of an alkyl pseudothiourea be treated with potassium acetate, the corresponding potassium halide and alkyl pseudothiourea acetate is produced. From this acetate, any of the desired alkyl sulphonyl halides may be produced directly by subjecting the acetate to the action of the desired halide in water solution.

Other salts of alkyl and aralkyl pseudothioureas may be produced in other manners, for example, from the reaction of thiourea with alkyl or aralkyl nitrates, thiocyanates, sulphates, etc. For example, from diethyl sulphate, or other alkyl or aralkyl sulphates, ethyl thiourea sulphate, or other alkyl or aralkyl thiourea sulphates, may be produced. The sulphates so produced may be subjected to the action of a halogen in aqueous solution with production of the corresponding alkyl or aralkyl sulphonyl halides, which may be produced by proper purification in pure state without contamination by other sulphonyl halides.

The invention will be further illustrated by the following examples, although it is not limited thereto (parts by weight):

*Example 1—N-butyl sulphonyl chloride from n-butyl alcohol.*—60 parts of n-butyl alcohol and 7.6 parts of powdered thiourea are admixed, and to the resulting solution is added an amount of hydrochloric acid slightly in excess of the amount required for equal molecular proportions with the thiourea. The solution is then heated on a steam bath for 3 or 4 days, or until a sample of the solution gives little or no silver sulphide when tested with ammoniacal silver nitrate. The excess n-butyl alcohol is then removed under reduced pressure on a steam bath and the viscous residue resulting dissolved in 75 parts of warm water. This solution is cooled and treated with chlorine while maintained below 15° C. Sufficient chlorine is added to saturate the aqueous layer, the saturation being shown by the characteristic green color of the saturated aqueous layer, and the n-butyl sulphonyl chloride which separates is taken up in ether. The ether extract is washed with dilute sodium bisulphite solution and dried over calcium chloride. The ether is removed. To further purify the sulphonyl chloride, it may be distilled under reduced pressure. The product has a boiling point of 79 to 81° C. (9 mm.). The reactions which take place in this procedure are shown in the following equation:

n—C₄H₉OH+HCl+CS(NH₂)₂ ⟶

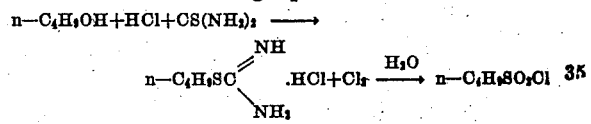

From the n-butyl sulphonyl chloride produced as described above, the corresponding sulphonic acid, n-butyl sulphonic acid, may be produced by hydrolyzing the sulphonyl chloride in boiling water, with the production of hydrochloric acid and n-butyl sulphonic acid. The hydrochloric acid and excess water may be readily removed by evaporation, and the sulphonic acid obtained. The sodium and potassium salts of the sulphonic acid may be obtained by interaction of the n-butyl sulphonyl chloride with sodium and potassium hydroxide in aqueous solution.

*Example 2—Ethyl sulphonyl chloride from ethyl sulphate.*—33 parts of diethyl sulphate and 30 parts of thiourea are warmed on a steam bath until solution is complete and a vigorous reaction takes place. The reaction, if it becomes too vigorous, may be modified by cooling the mixture. After the reaction is finished, alcohol is added and the mixture is further heated for about ½ hour to insure completion of the reaction. The solid ethyl pseudothiourea sulphate which is formed is filtered off and dried.

15.4 parts of the ethyl pseudothiourea sulphate are dissolved in 75 parts of water and the solution is cooled in an ice bath, and treated with chlorine while maintained below 15° C. The addition of chlorine is continued until the aqueous layer is distinctly green with excess chlorine. The ethyl sulphonyl chloride separates as an oil, and, after its separation is complete, may be separated mechanically or the mixture may be extracted with ether and the ether extract washed with dilute sodium bisulphite solution and dried over calcium chloride. The ether is removed and the ethyl sulphonyl chloride distilled under reduced pressure to purify it. It boils at 71–72° C. (12 mm.).

The reactions which take place when this procedure is followed are shown in the following equation:

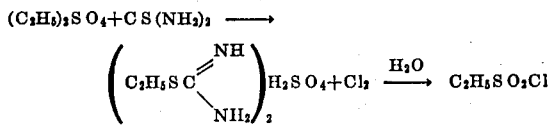

From the ethyl sulphonyl chloride so produced, the corresponding ethyl sulphonic acid is produced by hydrolyzing in boiling water. The sodium and potassium salts of the ethyl sulphonic acid may be formed by interaction of the ethyl sulphonyl chloride with sodium and potassium hydroxide in aqueous solution.

*Example 3—n-Heptyl sulphonyl chloride from n-heptyl bromide.*—18.5 parts of n-heptyl bromide, 7.6 parts of thiourea, and 18 parts of ethyl alcohol are heated on a steam bath under reflux conditions until all of the thiourea is in solution and a sample of the solution gives no precipitate of silver sulphide with ammoniacal silver nitrate. The ethyl alcohol is distilled off under reduced pressure and the n-heptyl pseudothiourea hydrobromide formed is allowed to crystallize.

20 parts of this hydrobromide are dissolved in 75 parts of hot water, and the resulting solution is treated with a hot solution of 35 parts of potassium acetate in 40 parts of water. The resulting mixture is cooled, and the precipitated n-heptyl pseudothiourea acetate is filtered off and purified by recrystallization from water. 12 parts of the n-heptyl pseudothiourea acetate are dissolved in 135 parts of water and 2 parts of concentrated hydrochloric acid are added. The resulting solution is cooled and treated with chlorine at a temperature below 15° C. After the n-heptyl sulphonyl chloride is completely separated, the mixture is extracted with ether, the ether extract is washed with dilute sodium bisulphite, and dried over calcium chloride. The ether is removed and the residue, consisting of n-heptyl sulphonyl chloride, is distilled under reduced pressure to purify it. The product has a boiling point of 126 to 129° C. (11 mm.).

The reactions which take place when this procedure is followed are shown in the following equation:

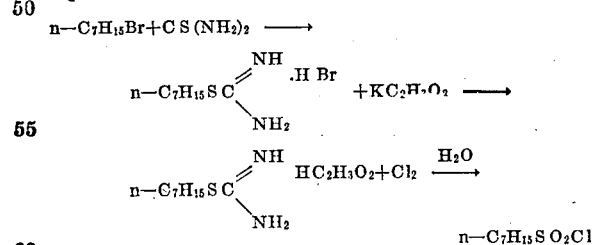

The corresponding n-heptyl sulphonic acid may be obtained from the sulphonyl chloride by hydrolyzing with water.

*Example 4—Ethyl sulphonyl bromide from ethyl bromide.*—Ethyl bromide and thiourea in equal molecular proportions are heated together in ethyl alcohol. When the thiourea is all dissolved, and a sample of the solution gives no silver sulphide with ammoniacal silver nitrate, the alcohol is removed under reduced pressure and the residue is allowed to crystallize. It is ethyl pseudothiourea hydrobromide.

18.5 parts of this ethyl pseudothiourea hydrobromide are dissolved in 200 cc. of water. The solution is cooled, and treated with 125 parts of bromine. The bromine is added over a period of about ¾ of an hour with vigorous stirring and while maintaining the temperature below 5° C. After the addition of bromine is complete, the reaction mixture is stirred at 5° C. or lower for about 3 hours. The precipitated ethyl sulphonyl bromide is taken up in ether and the excess bromine removed from this extract by washing with dilute sodium bisulphite, preferably in a series of washing operations with small portions of the bisulphite solution. The extract is then washed with water, dried and the ether distilled off. The resulting purified ethyl sulphonyl bromide is then distilled under reduced pressure to purify it. It boils at 84–86° C. (18 mm.).

The reactions which occur when this procedure is followed are shown in the following equation:

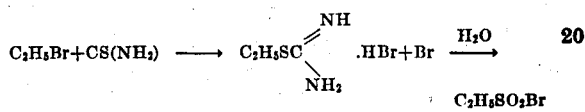

*Example 5—Benzylsulphonyl chloride from benzylchloride.*—12.6 parts of benzylchloride and 7.6 parts of powdered thiourea are warmed together on a steam bath until a vigorous reaction takes place. When the reaction subsides, the mixture is heated for a few minutes and then is dissolved in 150 parts of water. The resulting solution is cooled below 15° C. and is treated with chlorine with continued cooling, and while maintaining the temperature below 15° C. The addition of chlorine is continued until the reaction mixture has a distinct green color from the excess chlorine. The solid benzylsulphonyl chloride which separates is filtered off and the filtrate is tested for the completeness of the reaction by further addition of chlorine. The separated benzylsulphonyl chloride is dried over sulphuric acid and recrystallized from benzene. It has a melting point of 91–92° C.

The reactions which take place when this procedure is followed are similar to those shown for the production of ethyl sulphonyl bromide from ethyl bromide in Example 4 above.

Benzylsulphonic acid is produced from benzylsulphonyl chloride by hydrolysis with water, but the sulphonyl chloride undergoes partial decomposition during this hydrolysis with evolution of sulphur dioxide.

In addition to the sulphonyl halides and sulphonic acids described in the examples, numerous other sulphonyl halides and sulphonic acids may be prepared in accordance with the present invention. Among the alkyl sulphonyl halides which may be readily produced are the lower alkyl compounds such as the methyl, ethyl, the isomeric propyls, butyls, amyls, hexyls, heptyls, etc., as well as the higher alkyl sulphonyl halides such as the cetyl, oleyl, stearyl, etc. Also, the various aralkyl sulphonyl halides and the sulphonic acids may be readily prepared. Included among the aralkyl sulphonyl halides which may be readily prepared are the benzyl, phenyl ethyl, etc. For the production of such sulphonyl halides and sulphonic acids, the starting materials may be either the corresponding alcohols or corresponding substituted hydrocarbons, such as sulphates, chlorides, nitrates, etc.

The aralkyl derivatives, in addition to having the sulphonyl halide group or the sulphonic acid group attached to the alkyl chain, may also be substituted in the aromatic or cyclic nucleus. Substituents such as sulphonic acid groups, or halogen groups, or other groups, in the aromatic or cyclic nucleus in no way interfere with the process of the present invention for the production of sulphonyl halides and sulphonic acids, either in the production of the intermediate pseudothiourea derivatives, or the production of the sulphonyl halides and sulphonic acids from these intermediates.

The invention, as previously pointed out, is also applicable to the production of aromatic sulphonyl halides, in which the sulphonyl halide group is directly attached to the aromatic or cyclic nucleus, as well as the corresponding sulphonic acids. The intermediate pseudothiourea compounds, however, cannot be prepared in the manner described above for the production of alkyl and aralkyl pseudothiourea compounds, but must be prepared in some other manner, as by the addition of a thiophenol to a cyanamid.

While the invention has been described with particular reference to the production of sulphonyl chlorides and sulphonyl bromides, it also includes the production of homologous sulphonyl fluorides and sulphonyl iodides, and while it is particularly advantageous for use in the conversion of alkyl or aralkyl pseudothiourea salts to corresponding sulphonyl halides by the action of a halogen, it is also applicable to the production of sulphonyl halides from other compounds in which a pseudothiourea residue is connected to an alkyl group through the sulphur atom. Included in this class of compounds are compounds such as alkyl or aryl derivatives of alkyl pseudothioureas, in which the hydrogen atoms linked with the nitrogen are replaced by aliphatic or aromatic radicals, as well as heterocyclic compounds, in which the pseudothiourea nucleus is part of a ring structure.

I claim:

1. The process of producing compounds of the class consisting of alkyl and aralkyl sulphonyl halides and sulphonic acids which comprises subjecting an aqueous solution of an acid addition salt of a compound of the class consisting of S-arkyl and S-aralkyl pseudothioureas to the action of a halogen.

2. The process of producing compounds of the class consisting of sulphonyl halides and sulphonic acids which comprises subjecting an aqueous solution of an acid addition salt of a compound of the formula

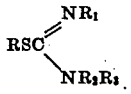

in which R is a radical from the class consisting of alkyl and aralkyl radicals and in which $R_1$, $R_2$, and $R_3$, are radicals indifferently selected from the class of hydrogen and alkyl, aralkyl and aryl radicals, to the action of a halogen.

3. The process of producing alkyl and aralkyl sulphonyl halides which comprises subjecting an aqueous solution of an acid addition salt of a compound of the formula

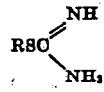

in which R is a group selected from the class consisting of alkyl and aralkyl groups, to the action of a halogen.

4. The process of producing alkyl sulphonyl halides which comprises reacting an acid addition salt of an S-alkyl pseudothiourea with a halogen in aqueous solution.

5. The process of producing aralkyl sulphonyl halides which comprises reacting an acid addition salt of an S-aralkyl pseudothiourea with a halogen in aqueous solution.

6. The process of producing sulphonyl chlorides which comprises subjecting an aqueous solution of a salt of a compound of the class consisting of S-alkyl and S-aralkyl pseudothioureas with an acid selected from the group consisting of hydrochloric and non-halogen containing acids to the action of chlorine.

7. The process of producing alkyl sulphonyl chlorides which comprises subjecting an aqueous solution of a salt of an S-alkyl pseudothiourea with an acid selected from the group consisting of hydrochloric and non-halogen containing acids to the action of chlorine.

8. The process of producing aralkyl sulphonyl chlorides which comprises subjecting an aqueous solution of a salt of an S-aralkyl pseudothiourea with an acid selected from the group consisting of hydrochloric and non-halogen containing acids to the action of chlorine.

9. The process which comprises reacting an alcohol with thiourea in the presence of an acid and converting the resulting pseudothiourea salt to the sulphonyl halide corresponding to the alcohol by subjecting an aqueous solution of it to the action af a halogen.

10. The process which comprises reacting an alcohol with thiourea in the presence of a hydrohalogen acid, converting the resulting salt to an acetate, and reacting an aqueous solution of the acetate with a halogen.

TREAT B. JOHNSON.